April 27, 1965   J. H. ENDRES ETAL   3,180,630
POLYMER MELTING
Filed May 13, 1963
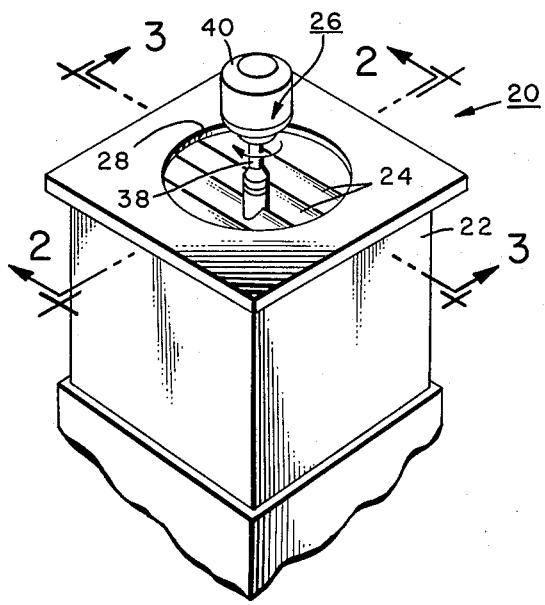
FIG. I.
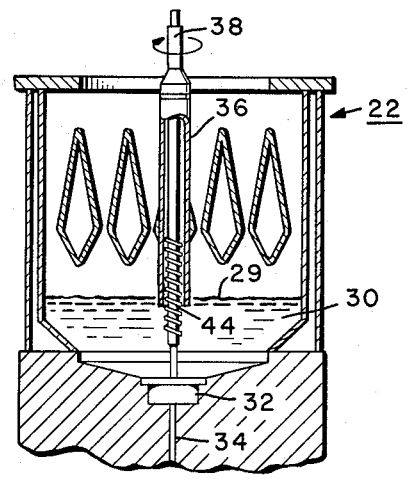
FIG. 2.
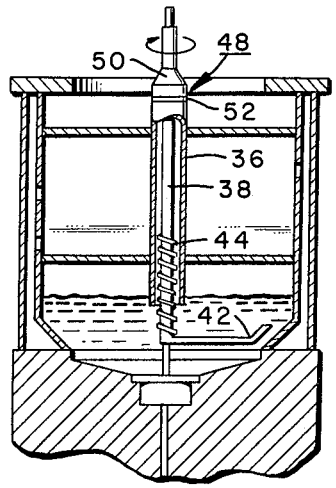
FIG. 3.
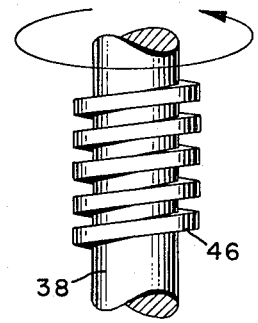
FIG. 4.
INVENTORS
JOHN H. ENDRES
JAMES R. NICHOLSON
BY
*Kelly O. Corley*
ATTORNEY

United States Patent Office

3,180,630
Patented Apr. 27, 1965

3,180,630
POLYMER MELTING
John H. Endres and James R. Nicholson, Pensacola, Fla., assignors to Monsanto Company, a corporation of Delaware
Filed May 13, 1963, Ser. No. 279,711
7 Claims. (Cl. 263—26)

The present invention concerns melting of polymers prior to extrusion in the known melt-spinning processes, and more particularly to such apparatus wherein polymer quality is maintained at a high level for a longer period of time than with prior art apparatus and processes. More specifically, the present invention concerns a modified power shaft arrangement for driving the distribution pump.

In known prior art melt-spinning processes, flakes of solid polymer such as nylon are fed into the top of a heated grid, where they are melted. The liquified polymer then falls to a melt pool beneath the grid. A distribution pump is submerged in the bottom of the pool to distribute the melted polymer to several metering pumps, which supply the polymer under pressure to spinnerets for extrusion. A motor is mounted above the grid and drives a vertical shaft extending downwardly through a guide sleeve through the grid to the distribution pump. After apparatus of this type has been in continuous operation for a few days, the molten polymer in the melt pool degrades, after which the entire grid assembly must be disassembled for cleaning.

The modifications according to the present invention substantially increase the service life of the melting grid before cleaning becomes necessary.

Accordingly, a primary object of the present invention is to substantially increase the service life of a polymer melting apparatus.

A further object is to provide improved pump shaft constructions and apparatus of the above character.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a more complete understanding of the nature and objects of the invention, reference should be made to the following detailed description taken in connection with the accompanying drawings, in which:

FIGURE 1 is a schematic perspective view of a melt jacket assembly incorporating a first embodiment of the present invention;

FIGURE 2 is a sectional view taken along line 2—2 of FIGURE 1;

FIGURE 3 is a sectional view taken along line 3—3 of FIGURE 1; and

FIGURE 4 is a fragmentary side elevation view of an alternative embodiment of the invention.

Referring now to FIGURE 1, there is shown an exemplary melt jacket assembly 20 which generally comprises a large chamber 22 containing a plurality of heated grids or fins 24, together with a pump assembly 26 for pumping the melted polymer to several metering pumps (not illustrated). Typically a heat exchange medium is pumped through the interior of the fins 24, heating them to a temperature somewhat above the melting point of the polymer. Polymer chips are added through the opening 28 at the top of chamber 22 by a suitable conveyor or hopper means (not illustrated), and are melted by contact with grids 24.

The molten polymer flows down the surfaces of grids 24 and falls to the surface 29 of a melt pool 30 in the bottom of chamber 22 (FIGURE 2). Pump assembly 26 includes a distribution pump 32 mounted in the bottom of melt pool 30, submerged in the liquid polymer, which pumps the polymer in pool 30 through a suitable distribution passage 34 to metering pumps, not illustrated. In the embodiment illustrated, a vertical sleeve 36 leads through the center fin 24. Pump 32 is driven by a vertical shaft 38 which extends through sleeve 36 to a vertically mounted electrical motor 40 (FIGURE 1). Shaft 38 may be keyed or secured in any known manner to the output shaft of motor 40 and to pump 32. As illustrated in FIGURE 3, preferably a paddle 42 is mounted on the lower end of shaft 38 to stir the molten polymer.

As noted above, after the apparatus as thus far described has been in operation for a given period of time, typically a few days, the quality of the output polymer gradually falls off to a point where the assembly 20 must be disassembled and cleaned. A principal cause of such product degradation has been found to be the formation of stagnant regions in the polymer. The polymer in such stagnant regions remains in the chamber 22 for a sufficient period of time to degrade under the action of heat, and forms gels which contaminate the polymer in the melt pool. It has been discovered that polymer tends to climb between shaft 38 and sleeve 36, and small flake particles occasionally fall between shaft 38 and sleeve 36 to form a stagnant region. Due to the high temperatures under which the apparatus operates, and possible poor shaft alignment within sleeve 36, it is difficult to effectively seal off the ends of sleeve 36 to shaft 38.

According to one aspect of the present invention, the stagnant area formation is substantially reduced and the service life between cleanings increased about 70 percent by incorporation of auxiliary pump means at the lower portion of shaft 38, which pumps polymer down and prevents molten polymer from climbing the shaft. Thus, as shown in FIGURES 1 through 3, wherein motor 40 rotates shaft 38 in a counterclockwise direction as viewed from pump 32, the auxiliary pump may be provided by forming a left-handed thread 44 on the lower portion of shaft 38 extending from somewhat above to below the lower end of sleeve 36. Preferably thread 44 is rectangular or square in cross section, and fits fairly closely in sleeve 36. This markedly reduces the tendency of polymer to climb shaft 38 and become stagnant inside sleeve 36. A clearance of about 1/16 of an inch between the outer surface of thread 44 and the inner surface of sleeve 36 has been found to be satisfactory when using a shaft 38 of approximately 3/4 of an inch diameter in a sleeve 36 having an inside diameter of one inch. The outside diameter of shaft 38, measured to the outer surface of the threads, would thus be 7/8 of an inch in this exemplary embodiment. Of course, if shaft 38 is rotated in the opposite direction by motor 40, a right-handed thread 46 would be used as illustrated in FIGURE 4.

In order to prevent solid flake particles from entering sleeve 36 from the top, a deflecting collar 48 is formed from a heavy annular member slidably mounted on shaft 38. Collar 48 preferably has an inside diameter approximately equal to the outside diameter of shaft 38 and has an outside diameter at its lower end approximately equal to the outside diameter of sleeve 36. The upper end of collar 48 has its outer surface 50 tapered to form a frustum of a cone, so that flake particles impinging on collar 48 are deflected away from shaft 38 and prevented from entering between the shaft and sleeve 36. An annular washer 52 of a suitable low friction material which is stable at the temperatures encountered within chamber 22, such as polytetrafluoroethylene, is press-fitted on shaft 38 between collar 48 and sleeve 36 to provide a sliding seal between shaft 38 and the upper end of sleeve 36. Collar 48 is preferably a relatively massive member, and bears upon the upper surface of washer 52, with sufficient force to hold washer 52 in close engagement with the upper edge of sleeve 36. Washer 52, in addition to its primary function of sealing shaft 38 to sleeve 36, prevents metal-to-metal sliding contact between collar 48 and sleeve 36, which might produce metal particles which would contaminate the polymer in melt pool 30.

In the apparatus as above described, the effective sealing of the upper end of sleeve 36 to shaft 38 provided by collar 48 and washer 52 prevents entry of polymer flakes to the interior of sleeve 36 from above, while the auxiliary pump formed by thread 44 prevents the polymer in melt pool 30 from climbing shaft 38 and entering sleeve 36 from below.

It is particularly noted that the auxiliary pump arrangement formed at the lower end of shaft 38 does not require precision machining or fitting of the parts, which is particularly advantageous in an application in which the apparatus must experience wide temperature changes. Similarly the seal provided at the upper end of sleeve 36 by the preferred construction illustrated requires no particular precision in manufacture, and expensive materials are not required. The construction of washer 52 from a suitable low friction plastic, such as polytetrafluoroethylene, provides the sliding contact required without the probability of introducing metal chips or flakes into the melt pool, which might occur if a metal-to-metal seal were attempted at this point. The formation of stagnant polymer within sleeve 36 is thus avoided, yielding significantly greater continuous service life before cleaning becomes necessary.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In polymer melting apparatus the combination comprising:
   (a) a chamber for containing molten polymer,
   (b) means defining an opening in the top of said chamber to permit introduction of solid polymer,
   (c) a heating grid in said chamber disposed beneath said opening for melting said solid polymer,
   (d) a sleeve extending downwardly through said grid,
   (e) a pump in the bottom of said chamber beneath said sleeve,
   (f) a drive shaft for operating said pump, said shaft extending upwardly from said pump through said sleeve to drive means,
   (g) and auxiliary pump means on said shaft at the bottom of said sleeve for opposing liquid flow upwardly along said shaft.

2. The combination of claim 1 wherein said pump comprises an inclined protuberance extending outwardly from said shaft within said sleeve, said protuberance having a leading edge higher than its trailing edge.

3. The combination of claim 2 wherein said inclined protuberance is in the form of a male thread.

4. The combination of claim 3 wherein said male thread is rectangular in cross-section.

5. The apparatus defined in claim 1, further comprising:
   (a) means for rotatably sealing said shaft to the upper end of said sleeve, said sealing means comprising:
      (1) an annular washer mounted on said shaft and having an outer diameter approximately as large as the outer diameter of said sleeve,
      (2) and a weight mounted on said shaft and bearing on said washer.

6. The combination defined in claim 5 wherein said washer is formed from a material having low friction properties and a relatively high temperature stability.

7. The combination defined in claim 6 wherein said washer is composed essentially of polytetrafluoroethylene.

References Cited by the Examiner
UNITED STATES PATENTS

| | | | |
|---|---|---|---|
| 1,504,658 | 8/24 | Ulmer | 103—111 |
| 1,842,081 | 1/32 | Durdin | 103—111 |
| 1,850,683 | 3/32 | Merrill | 103—111 |
| 2,127,962 | 8/38 | Rosener | 126—343.5 X |
| 2,683,073 | 7/54 | Pierce | 18—8 |
| 2,916,262 | 12/59 | Flores | 18—8 |
| 2,955,320 | 10/60 | Palmer et al. | 18—8 |
| 3,036,334 | 5/62 | Hayden | 18—8 |
| 3,102,301 | 9/63 | Dechene | 18—8 |

CHARLES SUKALO, *Primary Examiner.*

JOHN J. CAMBY, *Examiner.*

UNITED STATES PATENT OFFICE
CERTIFICATE OF CORRECTION

Patent No. 3,180,630                                        April 27, 1965

John H. Endres et al.

It is hereby certified that error appears in the above numbered patent requiring correction and that the said Letters Patent should read as corrected below.

Column 4, line 12, for "said pump" read -- said auxiliary pump means --.

Signed and sealed this 18th day of January 1966.

(SEAL)
Attest:

ERNEST W. SWIDER                                      EDWARD J. BRENNER
Attesting Officer                                         Commissioner of Patents